Dec. 1, 1953     E. ROCCATO     2,660,789
RESILIENT ANCHORING ASSEMBLY FOR DENTAL PROSTHESIS
Filed March 29, 1951

INVENTOR:
Emilio Roccato
By Denne Reichler
ATTORNEY

Patented Dec. 1, 1953

2,660,789

UNITED STATES PATENT OFFICE 2,660,789

RESILIENT ANCHORING ASSEMBLY FOR DENTAL PROSTHESIS

Emilio Roccato, Como, Italy

Application March 29, 1951, Serial No. 218,103

6 Claims. (Cl. 32—5)

The present invention relates to a resilient anchoring assembly between a dental prosthesis and the abutment teeth destined to support the prothesis.

Said assembly comprises a stud, which is secured to an anchoring member on the abutment tooth and is surrounded by a sleeve and provides the possibility of resilient relative movements of the dental prosthesis with regard to the abutment tooth by the action of a coil spring arranged between the stud and said sleeve.

The drawing illustrates in the way of an example an anchoring assembly according to the invention, and namely:

Figure 1:
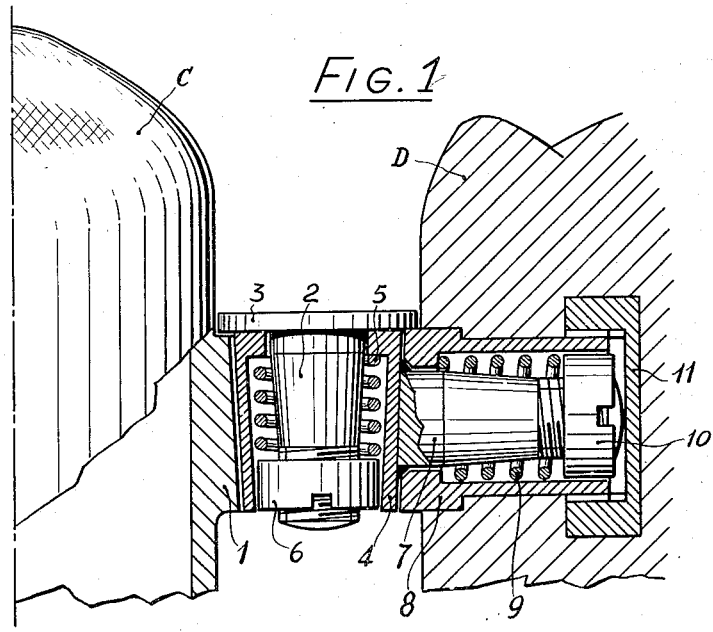
Fig. 1 illustrates the assembly mounted in place and in a joining position between the prosthesis and the abutment tooth, a part of said assembly being shown in axial section.
Figure 2:
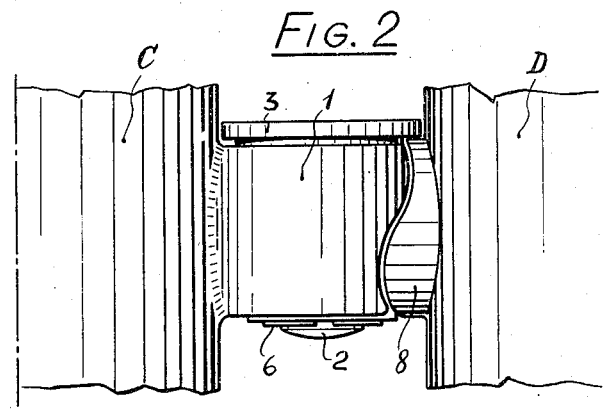
Fig. 2 shows an outside lateral view of the same assembly as illustrated in Fig. 1.

As it is apparent from the drawing, the assembly in question provides the joint between one of the outer teeth (D) of a dental prosthesis, with the metallic crown C of a tooth that constitutes the abutment for said prosthesis. Said crown C has, on its side facing towards the prosthesis, two small jaws 1 open on the side opposite their connection and shaped so as to receive the male member of the above mentioned joining assembly. The latter member comprises a stud member 2, having a substantially vertical axis, upwardly terminating in an expanded head 3 and being engaged in a sleeve or bushing 4, which is cylindrical or slightly conical in shape. Said sleeve houses a spring 5 that allows for relative movements, in several directions, of the stud 2 relatively to sleeve 4. Said spring 5 is kept in place by a washer 6 threaded on the screw-threaded end of stud 2, which end is opposite the flat disc head 3.

On said sleeve 4, another stud 7 is welded or otherwise secured, this other stud 7 being similar to stud 2, but having its axis either perpendicular or at a certain angle to the axis of the stud 2. The stud 7 is surrounded by a sleeve 8, the outer surface of which is preferably provided with shoulders as clearly illustrated in Figs. 1, 3 and 4; inside said sleeve, about stud 7 another helical spring 9, similar to spring 5, is coiled and kept in place by a washer 10 screwed on the threaded free end of stud 7.

Studs 2 and 7 and sleeves 4 and 8 may have triangular or polygonal cross-sections though, in the preferred embodiment, these cross-sections are circular. After assembling the different members constituting the above mentioned device, a small cover cap 11 is placed on sleeve 8. This cap is preferably screw-threaded. Then that part of this assembly, that is surrounded by sleeve 8, together with the latter, is incorporated in or secured in some other way on tooth D or another member of the prosthesis.

Thereupon, the connection between the prosthesis and the abutment tooth C will be obtained in a very simple way, by passing sleeve 4, fast to stud 7 and surrounding stud 2, between the jaws 1 fast with crown C of the abutment tooth. Connection between sleeve 4 and stud 7 may also be obtained by hinge means.

The resilient anchoring assembly for dental prosthesis above described, contrarily to the rigid connections heretofore known, allows relative movements, in practically all directions, of the prosthesis D relatively to the abutment tooth C, whereby the latter is subject to far lower stresses than with the above mentioned known arrangements.

Figure 3:
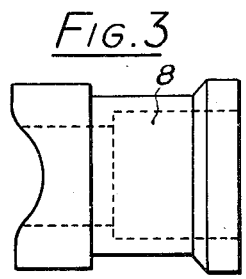
Figs. 3 and 4 illustrate respectively a lateral view and an axial section of one embodiment of the sleeve member or stud housing that is incorporated in the prosthesis.
Figure 4:
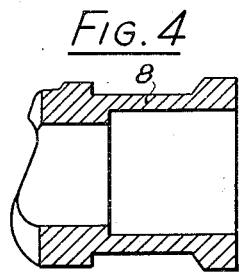

An important member of the assembly is the sleeve 8, which is clearly shown in Figs. 3 and 4, and can be placed with its stud 7, either accurately perpendicular to the axis of stud 2, or slightly slanted relative to the latter. The fact that washers 6 and 10 are screw-threaded on their respective studs 2 and 7 allows a very fine adjustment of the resilient and damping effect of their respective springs 5 and 9.

According to a variation of the above described assembly, which too belongs to this invention, the male member apt to be inserted between the jaws 1 may eventually be rigid instead of resilient as illustrated in the drawing; i. e. the male member may be constituted by a solid or hollow stud apt to be inserted between jaws 1. Also in this instance there will always be obtained a very good resilient effect provided by spring 9 and the play foreseen between stud 7 and sleeve 8, incorporated in the prosthesis.

Finally, the connection assembly described above may also be used with a hook joint instead of by means of the small jaws 1 as described above.

In this case, the portion incorporated in the prosthesis will remain unchanged as described and illustrated, except that stud 7 or bushing 4 will be in this instance welded to a wire or strip-shaped element destined to form the connecting hook for anchoring the prosthesis.

Also in this case, the presence of the spring assembly 7—3—9 inside the prosthesis will allow the desired resilient effect with the therefrom resulting advantages. In other words, this universal joint anchorage has a resilient effect in any horizontal, transverse or vertical direction, in respect to all rotational, wedging or overthrowing stresses.

The materials constituting the different members of the assembly described above, their dimensions and their respective constructive details may vary according to needs without departing from the scope of the present invention.

What I claim is:

1. Dental prothesis with assembly for resilient anchorage on an abutment tooth, comprising a dental prothesis, a member adapted to engage said abutment tooth, a first stud having one end connected to said member and having another free end, a first sleeve housing said first stud and being secured to said prothesis, a first helical spring arranged between said first stud and said first sleeve and holding said first stud and first sleeve in resiliently movable relationship, said member forming a protective crown of said abutment tooth and having two protruding jaws, a male member inserted between said jaws, forming a second sleeve and being rigidly connected with said first stud, a second stud housed by said second sleeve, and a second spring arranged between said second sleeve and said second stud and holding said second sleeve and second stud in resiliently movable relationship, said second stud protruding upward from said second sleeve and having an end forming an expanded head.

2. Dental prothesis with assembly for resilient anchorage on an abutment tooth, comprising a dental prothesis, a member adapted to engage said abutment tooth, a stud having one end connected to said member and having another free end, a sleeve housing said stud and being secured to said prothesis, a helical spring arranged between said stud and said sleeve and holding said stud and sleeve in resiliently movable relationship, said free end of said stud being threaded, and a threaded washer engaging said threaded end and abutting said spring whereby the tension of said spring can be adjusted.

3. Dental prothesis with assembly for resilient anchorage on an abutment tooth, comprising a dental prothesis, a member adapted to engage said abutment tooth, a first stud having one end connected to said member and having another free end, a first sleeve housing said first stud and being secured to said prothesis, a first helical spring arranged between said first stud and said first sleeve and holding said first stud and first sleeve in resiliently movable relationship, said free end of said first stud being threaded, a threaded washer engaging said threaded end and abutting said first spring whereby the tension of said first spring can be adjusted, said member forming a protective crown of said abutment tooth and having two protruding jaws, a male member inserted between said jaws, forming a second sleeve and being rigidly connected with said first stud, a second stud housed by said second sleeve, a second spring arranged between said second sleeve and said second stud and holding said second sleeve and second stud in resiliently movable relationship, said second stud protruding upward from said second sleeve, having an upper end forming an expanded head and having a lower free and threaded end, and a threaded washer engaging said lower end and abutting said second spring whereby the tension of said second spring can be adjusted.

4. Dental prothesis with assembly for resilient anchorage on an abutment tooth, comprising a dental prothesis, a member adapted to engage said abutment tooth, a first stud having one end connected to said member and having another free end, a first sleeve housing said first stud and being secured to said prothesis, a first helical spring arranged between said first stud and said first sleeve and holding said first stud and first sleeve in resiliently movable relationship, said free end of said first stud being threaded, a threaded washer engaging said threaded end and abutting said first spring whereby the tension of said first spring can be adjusted, said member forming a protective crown of said abutment tooth and having two protruding jaws, a male member inserted between said jaws, forming a second sleeve and being rigidly connected with said first stud, a second stud housed by said second sleeve, a second spring arranged between said second sleeve and said second stud and holding said second sleeve and second stud in resiliently movable relationship, said second stud protruding upward from said second sleeve, having an upper end forming an expanded head and having a lower free and threaded end, and a threaded washer engaging said lower end and abutting said second spring whereby the tension of said second spring can be adjusted, the longitudinal axis of said first stud being perpendicular to the longitudinal axis of said second stud.

5. Dental prothesis with assembly for resilient anchorage on an abutment tooth, comprising a dental prothesis, a member adapted to engage said abutment tooth, a first stud having one end connected to said member and having another free end, a first sleeve housing said first stud and being secured to said prothesis, a first helical spring arranged between said first stud and said first sleeve and holding said first stud and first sleeve in resiliently movable relationship, said free end of said first stud being threaded, a threaded washer engaging said threaded end and abutting said first spring whereby the tension of said first spring can be adjusted, said member forming a protective crown of said abutment tooth and having two protruding jaws, a male member inserted between said jaws, forming a second sleeve and being rigidly connected with said first stud, a second stud housed by said second sleeve, a second spring arranged between said second sleeve and said second stud and holding said second sleeve and second stud in resiliently movable relationship, said second stud protruding upward from said second sleeve, having an upper end forming an expanded head and having a lower free and threaded end, and a threaded washer engaging said lower end and abutting said second spring whereby the tension of said second spring can be adjusted, the longitudinal axis of said first stud being positioned angularly with respect to the longitudinal axis of said second stud.

6. Dental prothesis with assembly for resilient anchorage on an abutment tooth, comprising a dental prothesis, a member adapted to engage said abutment tooth, a stud having one end connected to said member and having another free end, a sleeve housing said stud and being secured to said prothesis, a helical spring arranged between said stud and said sleeve and holding said stud and sleeve in resiliently movable relationship, play being provided between said stud and said sleeve whereby said stud is movable relatively to said sleeve in all directions, said spring being positioned in said play, having one end engaging said sleeve and having another end connected to said stud.

EMILIO ROCCATO.

References Cited in the file of this patent

UNITED STATES PATENTS

| Number | Name | Date |
| --- | --- | --- |
| 744,291 | Carr | Nov. 17, 1903 |
| 832,528 | Bennett | Oct. 2, 1906 |
| 1,665,975 | Oscher | Apr. 10, 1928 |

FOREIGN PATENTS

| Number | Country | Date |
| --- | --- | --- |
| 147,330 | Austria | Oct. 26, 1936 |
| 268,043 | Switzerland | July 17, 1950 |